United States Patent Office 3,416,885
Patented Dec. 17, 1968

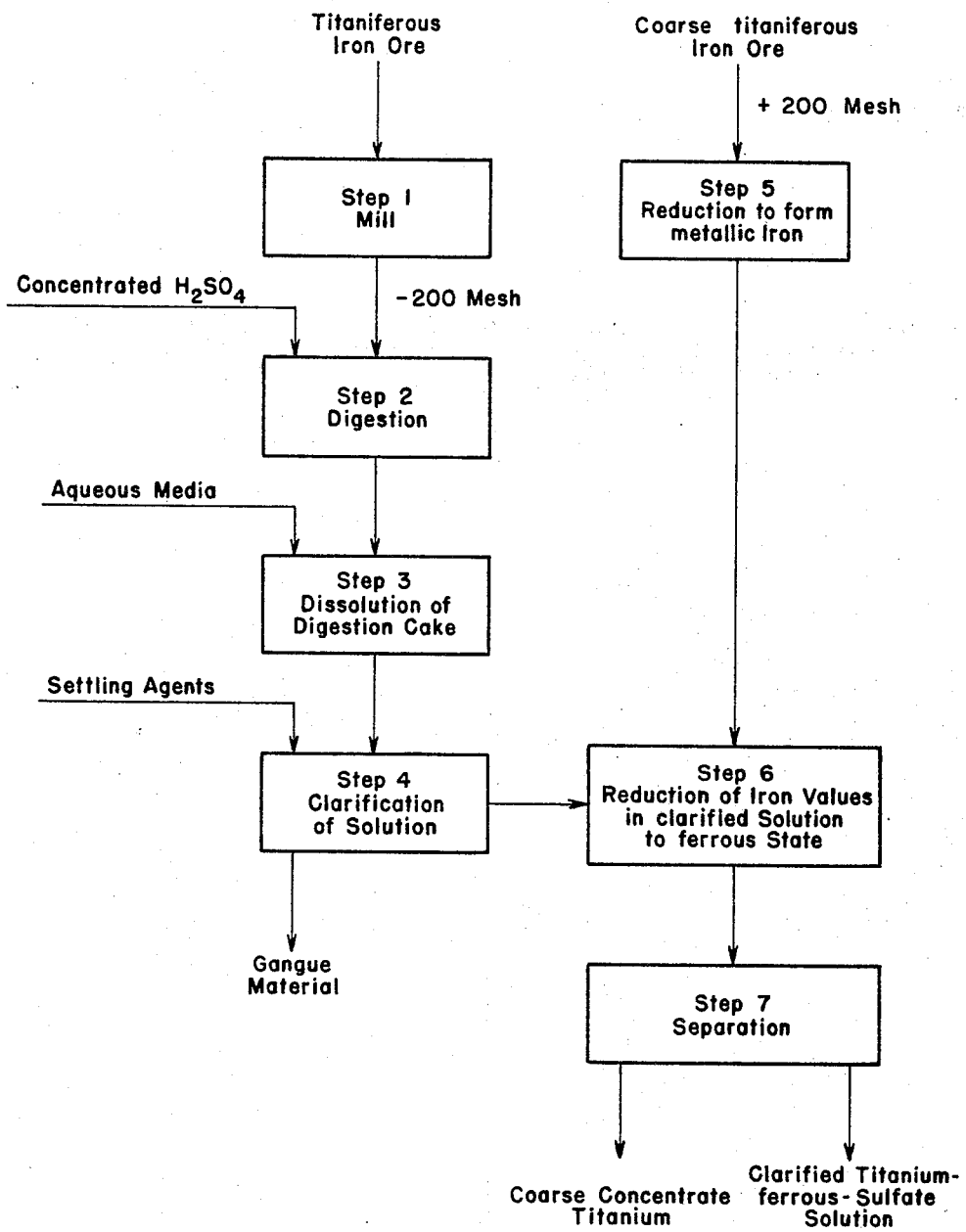

3,416,885
PROCESS FOR PRODUCING A TITANIUM SULFATE SOLUTION AND A TiO$_2$ CONCENTRATE FROM A TITANIFEROUS ORE
Andrew P. Honchar, Westfield, N.J., assignor to National Lead Company, New York, N.Y., a corporation of New Jersey
Filed Mar. 1, 1966, Ser. No. 530,985
5 Claims. (Cl. 23—117)

This invention relates in general to treatment of a titaniferous ore to recover the titanium values in a useful form for the production of titanium products. More specifically it relates to treatment of a titaniferous ore to produce a titanium ferrous sulfate solution adaptable for the manufacture of titanium dioxide pigments and a titanium concentrate adaptable for chlorination in the production of titanium tetrachloride.

As is well known in the art, titanium-iron sulfate solutions are prepared commercially by reacting finely ground titaniferous iron ores, particularly ilmenite ores, with concentrated sulfuric acid to form a digestion cake which is dissolved in either water or weak acid to form a titanium-iron sulfate solution. The iron values in said solution are in the ferric state and are subjected to a reducing treatment, usually by adding scrap iron to the solution, to convert the ferric iron values to ferrous sulfate, which, by cooling and crystallizing may be removed from the titanium-iron sulfate solution by filtration. Thus, the iron values are prevented from contaminating the titanium values when they are subsequently hydrolyzed in the production of titanium dioxide pigment.

In order to obtain high yields of titanium and the separation and removal of as much iron as is feasible, it is usually necessary to grind all of the ore prior to digestion until the particle size is less than 200 mesh. By so doing it is possible to obtain yields of over 90% of both the titanium and iron values as soluble sulfates in solution. The undissolved portion of the solution, called gangue, contains most of the silicon and aluminum compounds and other impurities. The necessity for grinding all the ore to less than 200 mesh is, of course, expensive. Moreover since most titaniferous iron ores contain high percentages of ferric iron which must be reduced to ferrous iron and separated from the titanium solution before hydrolysis in the production of titanium dioxide pigments, large quantities of metallic iron such as scrap iron must be employed. Metallic iron in any form is expensive.

Many methods have also been proposed for preparing titanium concentrates which are adaptable for chlorination to produce, for example, titanium tetrachloride. These concentrates are generally prepared from titaniferous ores and in order to minimize the amount of chlorine used in converting the titanium values to TiCl$_4$ it is essential that the concentrate contain a minimum amount of iron. In general, the removal of iron from a titaniferous ore is accomplished by first metallizing the iron values and then leaching out the metallized iron values by acid leaching—a process which is both complex and expensive.

An object, therefore, of this invention is to provide a process for treating a titaniferous ore so as to produce both a titaniferous sulfate solution and a titanium concentrate in a simple and economical manner. A further object is to produce a relatively inexpensive process for treating a titaniferous ore to produce a reduced titanium sulfate solution without the use of scrap iron and in addition to produce a titanium concentrate low in iron. These and other objects will become apparent from the following and more complete description of the instant invention.

Broadly, this invention contemplates a process for producing both a titanium concentrate low in iron which is adaptable for chlorination, and at the same time a clarified and reduced titanium sulfate solution adaptable for the production of titanium dioxide pigments, said process comprising the steps of:

(1) Grinding a titaniferous iron ore until the particle size of said ore is substantially all minus 200 mesh;
(2) Digesting the finely ground ore in concentrated sulfuric acid to produce a digestion cake;
(3) Dissolving the soluble portion of said cake in aqueous media, either in water or dilute acid, to form a raw, i.e., unreduced titanium-iron sulfate solution and a gangue comprising the finely divided undigested and undissolved portions of the cake;
(4) Clarifying said raw titanium-iron sulfate solution by removing said gangue material therefrom;
(5) Separately subjecting a second titaniferous iron ore to a reducing operation to reduce substantially all of the iron values, but not the titanium values, to the metallic state, said second ore having a particle size substantially greater than 200 mesh;
(6) Adding the reduced ore containing the metallic iron produced from step (5) into the clarified, unreduced titanium-iron sulfate solution produced in step (4) to reduce substantially all the iron values in said clarified, unreduced titanium-iron sulfate solution to the ferrous state and simultaneously leach out the metallic iron from said reduced ore to produce both a clarified, reduced titanium sulfate-ferrous sulfate solution and a coarse, titanium concentrate which is low in iron; and
(7) Separating said clarified and reduced sulfate solution from said coarse titanium concentrate.

In order to enable those skilled in the art to practice the present invention, a detailed description of the operation of the process is given below:

FIGURE 1 is a flow sheet showing the various steps of the invention. According to the flow sheet, in carrying out the process of the instant invention, a first titaniferous iron ore, usually an ilmenite ore, is ground preferably in a ball or rod mill until the particle size of the ore is substantially all minus 200 mesh. The ground ore is then mixed with a calculated amount of concentrated sulfuric acid and reacted at elevated temperature in a conventional manner to initiate the exothermic reaction to form a relatively dry cake containing titanium and iron sulfates. The relatively dry digestion cake is then solubilized in an aqueous media of water or dilute acid whereupon the titanium and iron sulfate values are dissolved to form a raw, i.e., unreduced titanium-iron sulfate solution in which the undigested portion of the ore is present in the form of a gangue material comprising silicon and aluminum compounds and other impurities originally present in the titaniferous ore. This raw sulfate solution is treated with antimony oxide and then clarified by adding thereto a mixture of glue and an alkalizing agent, such as NaHS, to effect settling of the gangue materials which are then removed from the clarified solution by conventional separation techniques. Removal of the gangue materials from raw, unreduced sulfate solution at this stage in the process, i.e. before the metallized ore is added to effect reduction of the sulfate solution and formation of the titanium concentrate, is a significant aspect of the invention since by so doing the need for subsequently separating the titanium concentrate from gangue materials in the reduced sulfate solution is eliminated.

In order to form the metallized ore used in step (5) of the process of the instant invention, a second titaniferous iron ore is subjected to a reducing operation until substantially all the iron values are reduced to the metallic state. The ore charge used in the reducing operation may be and preferably is, for reasons of economy and efficiency of operation, fairly coarse in size—preferably greater than 200 mesh, and is reduced by admixing the ore with a reducing agent such as carbon and heating the mixture to an elevated temperature preferably above about 1100° C., to reduce the iron values to the metallic state. The reduced ore is then cooled in the absence of an oxidizing atmosphere.

After the ore has been reduced it is added to the clarified, unreduced titanium iron sulfate solution produced in step (4). The metallic iron in the reduced ore is readily dissolved by the sulfuric acid present in the sulfate solution and reacts with the ferric iron values in the clarified solution to reduce the ferric iron values to soluble ferrous sulfate, the amount of reduced ore added being sufficient to effect reduction of substantially all of the ferric iron to the ferrous state.

With the dissolution of substantially all of the metallic iron present in the reduced ore there remains, in the clarified and reduced sulfate solution, a coarse titanium concentrate low in iron which is separated from the clarified and reduced sulfate solution by filtering. This separated ore residue constitutes a titanium concentrate high in titanium content and low in iron. Following the procedure of the instant invention, the titanium content of this concentrate is at least 85% $TiO_2$ and is useful as a chlorination feed in the production of $TiCl_4$. The clarified and reduced sulfate solution which is recovered as the filtrate may be given a second clarification treatment to remove any small quantities of residual solids, and then used as the feed solution for crystallization and subsequent hydrolysis to produce pigmentary $TiO_2$.

As pointed out above, the two ores used to produce the sulfate solution and the titanium concentrate, respectfully, are preferably of different particle size—the former less than 200 mesh and the latter plus 200 mesh. Thus, it is within the purview of the instant invention to prepare the two ores from a single ore source but grind less than all of the ore, i.e., only half of the ore to less than 200 mesh for digestion, thereby effecting an economy in the cost of ore preparation. Moreover, the use of a relatively coarse ore for metallization has the added advantage that the titanium concentrate produced therefrom may be used as a chlorination feed without recourse to briquetting or pelletizing as is necessary when the feed material is too fine.

In addition to the above economic advantages of the invention, the concept of adding a metallized ore to a clarified, unreduced sulfate solution not only eliminates the use of expensive scrap iron, as practiced by the prior art, but also effects the recovery directly, from the clarified solution, of a titanium concentrate low in iron values.

In order to more fully illustrate the instant invention the following example is presented.

An ilmenite ore having the following composition was ground in a steel ball mill until substantially all of the particles were —200 mesh.

ORE ANALYSIS

| | Percent |
|---|---|
| $Fe_2O_3$ | 5.4 |
| FeO | 38.5 |
| $TiO_2$ | 44.9 |
| $SiO_2$ | 4.4 |
| $Al_2O_3$ | 2.4 |
| Other metal oxides | 4.4 |

1000 parts of the ground ore were reacted with 1535 parts of 96% $H_2SO_4$ and 185 parts of $H_2O$. The reaction mass was heated to 160–180° C. to form a solid digestion cake. 1000 parts of the cake were dissolved in 1250 parts of water. The resulting titanium-iron-sulfate solution was then clarified by dissolving 0.9 part of antimony oxide in the solution and then adding 53 parts of NaHS and 0.1 part of glue, allowing the solution to stand and filtering off the clarified solution. The gangue-free, clarified solution had the following analysis:

| | Percent |
|---|---|
| $FeSO_4$ | 12.5 |
| $Fe_2(SO_4)_3$ | 4.8 |
| $TiO_2$ | 8.0 |
| $H_2SO_4$ | 19.1 |

Spec. gravity 1.466 at 60° C.

Next, a metallized ore charge was prepared for use as a reductant of the ferric iron values in the aforesaid clarified sulfate solution by subjecting another ilmenite ore, to a reduction treatment. This ore had the following analysis:

ANALYSIS OF ORE

| | Percent |
|---|---|
| $Fe_2O_3$ | 23.7 |
| FeO | 10.9 |
| $TiO_2$ | 59.8 |
| $SiO_2$ | 1.0 |
| $Al_2O_3$ | 2.0 |
| Other metal oxides | 2.6 |

PARTICLE SIZE OF THE ORE

| Size: | Percentage |
|---|---|
| 48 mesh | 4.3 |
| —48+65 mesh | 21.7 |
| —65+100 mesh | 50.1 |
| —100+200 mesh | 23.7 |
| —200 mesh | 0.2 |

500 parts of this ore, which was unground and hence relatively coarse, were mixed with 675 parts of carbon (added as petroleum coke) and the mixture was heated to 1200° C. in a retort in the absence of an oxidizing atmosphere. After 7 hours at a temperature above 1100° C. the reduced ore was then cooled in the absence of air and magnetically separated to recover a metallized ilmenite ore having the following analysis:

| | Percent |
|---|---|
| Total iron values as Fe | 29.0 |
| Fe (Met.) | 26.6 |
| $TiO_2$ | 70.0 |

91.7% of the iron values in the original ore had been reduced to the metallic state.

37 parts of this metallized ore were then added to 1000 parts of the clarified titanium-iron-sulfate solution produced as described hereinabove this amount of metallized ore being sufficient to reduce all of the ferric iron values in the clarified sulfate solution to the ferrous state. The clarified reduced titanium-ferrous-sulfate solution was then filtered from the residual relatively coarse undissolved portion of the metallized ore. The filtered solution had the following analysis:

| | Percent |
|---|---|
| $Ti^{+4}$ calculated as $TiO_2$ | 8.3 |
| $Ti^{+3}$ calculated as $TiO_2$ | 0.1 |
| $Fe^{+2}$ calculated as $FeSO_4$ | 19.95 |
| $H_2SO_4$ (Total) | 15.25 |

Following washing and drying, the coarse undissolved portion of the leached metallized ore constituted a titanium concentrate which analyzed as follows:

| | Percent |
|---|---|
| $TiO_2$ | 92.9 |
| Total iron as FeO | 5.5 |
| Other constituents | 1.6 |

This titanium concentrate being low in iron and high in $TiO_2$ was suitable as a chlorination feed material for the production of $TiCl_4$; while the clarified, reduced titanium-ferrous-sulfate solution was readily concentrated and hydrolyzed by conventional procedures to produce a hydrate which could be calcined to produce a $TiO_2$ pigment.

By utilizing the process of the instant invention, it is possible to produce efficiently and economically, two useful products, i.e., (1) a titanium sulfate solution adaptable for manufacture of titanium dioxide pigments and (2) a titanium concentrate adaptable for chlorination processes. These products are produced by: (1) preparing a raw, unreduced titanium-iron sulfate solution; (2) clarifying the raw, unreduced sulfate solution to remove the gangue materials therefrom; (3) preparing a coarse metallized ore; and (4) adding the metallized ore to the clarified, unreduced titanium-iron sulfate solution to reduce the iron values in said solution to the ferrous state and simultaneously dissolve the metallized iron from the coarse metallized ore; and thereafter recovering the substantially coarse titanium concentrate low in iron from the clarified and reduced sulfate solution. The metallic iron in the metallized ore is thus used in place of scrap iron, as practiced in the prior art, to reduce the iron values in a raw titanium-iron sulfate solution. Moreover by removing the gangue material from the raw titanium-iron sulfate solution before the metallized ore is added thereto, the need for separating the titanium concentrate from the gangue materials of the sulfate solution is eliminated. By utilizing the process of this invention substantial economies are achieved in materials and operation costs as well as simplicity and dependability of operation.

While this invention has been described and illustrated by the examples shown, it is not intended to be strictly limited thereto, and other variations and modifications may be employed within the scope of the following claims.

I claim:

1. In a process for producing concurrently a titanium concentrate containing a high percentage of $TiO_2$ and a low percentage of iron, and adaptable for chlorination to produce titanium tetrachloride, and a sulfate solution of titanium and ferrous iron adaptable for the production of titanium dioxide pigments, the steps which comprise: (1) grinding a titaniferous iron ore until the particle size of said ore is substantially minus 200 mesh; (2) digesting the finely ground ore in concentrated sulfuric acid to produce a digestion cake comprising a digested portion and an undissolved gangue portion; (3) dissolving the digested portion of the cake in an aqueous media to form a raw unreduced titanium-iron-sulfate solution containing said undissolved gangue portion as a residue; (4) clarifying said unreduced solution by removing the gangue portion from said solution; (5) separately subjecting a second titaniferous iron ore having a particle size substantially greater than 200 mesh to a reducing operation to reduce substantially all of the iron values, but not the titanium values, to the metallic state; (6) adding the said metallized iron ore to the said clarified, unreduced titanium iron sulfate solution formed in step (4) to reduce substantially all of the iron values in said raw titanium-iron sulfate solution to the ferrous state producing simultaneously a reduced titanium-ferrous sulfate solution and a coarse titanium concentrate low in iron and (7) separating said clarified titanium ferrous sulfate solution from the coarse titanium concentrate.

2. Process according to claim 1 in which the coarse titanium concentrate produced contains at least 90% $TiO_2$.

3. Process according to claim 1 in which the titaniferous iron ore employed in step (1) is an ilmenite ore.

4. Process according to claim 1 in which the titaniferous ore employed in step (5) is an unground ilmenite ore.

5. Process according to claim 1 wherein a settling agent is added to said raw, unreduced titanium-iron-sulfate solution to settle out the gangue material as a residue.

References Cited

UNITED STATES PATENTS

| | | | |
|---|---|---|---|
| 1,831,852 | 11/1931 | Farup | 23—202 |
| 2,089,180 | 8/1937 | Bousquet et al. | 23—202 |
| 2,290,112 | 7/1942 | Merriam et al. | 75—115 XR |
| 2,416,216 | 2/1947 | Rau et al. | 23—117 |
| 2,589,910 | 3/1952 | Schneider | 23—117 |
| 3,091,515 | 5/1963 | Dantro et al. | 23—117 XR |
| 3,112,178 | 11/1963 | Judd | 23—202 |
| 3,252,787 | 5/1966 | Shiah | 75—1 |

EARL C. THOMAS, *Primary Examiner.*

E. STERN, *Assistant Examiner.*

U.S. Cl. X.R.

23—126, 202; 75—1, 115